US008654846B2

(12) United States Patent
Sakamoto

(10) Patent No.: US 8,654,846 B2
(45) Date of Patent: Feb. 18, 2014

(54) MOTION COMPENSATOR, MOTION COMPENSATION PROCESSING METHOD AND COMPUTER PROGRAM

(75) Inventor: Daisuke Sakamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1483 days.

(21) Appl. No.: 11/674,412

(22) Filed: Feb. 13, 2007

(65) Prior Publication Data

US 2007/0195884 A1 Aug. 23, 2007

(30) Foreign Application Priority Data

Feb. 17, 2006 (JP) ................................ 2006-041655

(51) Int. Cl.
*H04N 7/12* (2006.01)

(52) U.S. Cl.
USPC ................................ 375/240.15; 375/240.18

(58) Field of Classification Search
USPC ............................ 375/240.15, 240.16, 240.17
See application file for complete search history.

(56) References Cited

U.S. PATENT DOCUMENTS

| 5,862,261 | A  | * | 1/1999  | Lee ................................ 382/236 |
|-----------|----|---|---------|----------------------------------------------|
| 6,580,829 | B1 | * | 6/2003  | Hurst et al. .................... 382/236    |
| 7,242,717 | B2 | * | 7/2007  | Li et al. ...................... 375/240.18  |
| 7,260,148 | B2 | * | 8/2007  | Sohm ........................ 375/240.16     |
| 7,280,599 | B2 | * | 10/2007 | Karczewicz et al. ..... 375/240.17           |
| 8,345,764 | B2 | * | 1/2013  | Zhan et al. ................ 375/240.16      |
| 2001/0002922 | A1 | * | 6/2001 | Hayashi ................... 375/240.16       |
| 2002/0009143 | A1 | * | 1/2002 | Arye ........................ 375/240.16     |
| 2002/0131500 | A1 | * | 9/2002 | Gandhi et al. ........... 375/240.16         |
| 2002/0186772 | A1 | * | 12/2002 | Li et al. ..................... 375/240.18 |
| 2003/0009143 | A1 | * | 1/2003 | Ludwig et al. ........... 604/385.22        |
| 2003/0081675 | A1 | * | 5/2003 | Sadeh et al. .............. 375/240.03       |
| 2003/0163281 | A1 | * | 8/2003 | Yang ............................... 702/150 |
| 2004/0057520 | A1 | * | 3/2004 | Sun .......................... 375/240.16     |
| 2004/0120402 | A1 | * | 6/2004 | Park et al. ................ 375/240.16      |
| 2004/0184541 | A1 | * | 9/2004 | Brockmeyer et al. ..... 375/240.16           |
| 2004/0252230 | A1 | * | 12/2004 | Winder ...................... 348/402.1    |
| 2005/0179814 | A1 | * | 8/2005 | Pau et al. ...................... 348/448   |
| 2005/0219071 | A1 | * | 10/2005 | Kajita et al. .................... 341/50  |
| 2006/0120613 | A1 | * | 6/2006 | Su et al. ......................... 382/236 |
| 2006/0193527 | A1 | * | 8/2006 | Kalva et al. ................... 382/239    |
| 2006/0222074 | A1 | * | 10/2006 | Zhang .................... 375/240.16      |
| 2007/0195886 | A1 |   | 8/2007 | Sakamoto ................ 375/240.18         |
| 2007/0223588 | A1 | * | 9/2007 | Lee .......................... 375/240.16    |
| 2007/0230742 | A1 | * | 10/2007 | Burns et al. .................. 382/103    |
| 2008/0107179 | A1 | * | 5/2008 | Nilsson .................... 375/240.16     |

FOREIGN PATENT DOCUMENTS

JP 2005-167720 6/2005

* cited by examiner

*Primary Examiner* — Eleni Shiferaw
*Assistant Examiner* — Abu Sholeman
(74) *Attorney, Agent, or Firm* — Fitzpatrick, Cella, Harper & Scinto

(57) ABSTRACT

A motion compensator detects a first shift amount between temporally adjacent first and second frames, wherein the first shift amount is detected based upon a differential value between pixels constituting the first frame and pixels constituting the second frame; stores in a storing unit of information of the detected first shift amount with regard to each reference frame candidate; calculates a second shift amount between the input frame and each reference frame candidate based upon the first shift amount or a sum of the first shift amount from each reference frame candidate to the input frame; selects a reference frame candidate for which the second shift amount is smallest as a reference frame; and calculates a motion vector, with regard to each macro block of the input frame, based upon each macro block of the reference frame.

27 Claims, 6 Drawing Sheets

FIG. 6

REFERENCE FRAME CANDIDATES 600

| FRAME NO. 0 | | FRAME NO. 1 | | FRAME NO. 2 | |
|---|---|---|---|---|---|
| GV(4, 1) | GV(5, 5) | GV(7, 6) | GV(−5, −5) | GV(−5, −5) | GV(7, 6) |
| GV(7, 6) | GV(3, 3) | GV(4, 1) | GV(−1, −2) | GV(5, 5) | GV(−1, −1) |

CURRENT FRAME 601

| FRAME NO. 3 | |
|---|---|
| GV(5, 5) | GV(7, 6) |
| GV(−5, −5) | GV(3, 4) |

MOTION COMPENSATOR, MOTION COMPENSATION PROCESSING METHOD AND COMPUTER PROGRAM

BACKGROUND OF THE INVENTION

1. Field of the Invention

The present invention relates to a motion compensator, a motion compensation processing method and a computer program.

2. Description of the Related Art

The digitization of multimedia-related information has accelerated in recent years and has been accompanied by increasing demand for video information of higher image quality. A specific example that can be mentioned is the transition from conventional SD (Standard Definition) of 720×480 pixels to HD (High Definition) of 1920×1080 pixels in broadcast media. However, this demand for higher image quality has led simultaneously to an increase in quantity of data and, as a result, compression encoding techniques and decoding techniques that surpass conventional capabilities have been sought.

In response to such demand, the activities of the ITU-T SG16, ISO/IEC and JTC1/SC29/WH11 have moved forward the standardization of compression encoding techniques using inter-frame prediction, which utilizes the correlation between images. One of these techniques is H.264/MPEG-4 PART 10 (AVC (referred to below as "H.264"), which is as an encoding scheme said to implement the most highly efficient encoding available at present. The specifications of encoding and decoding according to H.264 are disclosed in the specification of Japanese Patent Application Laid-Open No. 2005-167720, by way of example.

One technique newly introduced by H.264 is a technique whereby a reference image used in inter-frame prediction encoding is selected from among a plurality of images (this shall be referred to as "multiple reference inter-frame prediction" below).

According to such conventional encoding schemes as MPEG-1, MPEG-2 and MPEG-4 (referred to simply as "MPEG encoding schemes" below), forward-prediction and backward-prediction functions are available in instances where motion prediction is carried out. Forward prediction is a prediction scheme in which an image frame situated later in terms of time is predicted from an image frame situated earlier in terms of time. Backward prediction is a prediction scheme in which an image frame situated earlier in terms of time is predicted from an image frame situated later in terms of time. For example, with backward prediction, an image frame that skipped encoding earlier can be predicted based upon the present image frame.

According to forward prediction and backward prediction in this MPEG encoding, often an image immediately before or after an image to undergo processing is used as a reference frame to which reference is made when motion prediction is performed. The reason for this is that in many cases there is a high degree of correlation between the image to be processed and an image that is nearby in terms of time.

With an MPEG encoding scheme, however, there can be occasions where there is a large change between images, as when camera motion such as panning and tilting in shooting moving images is fast or in the case of an image immediately after a cut change. In such cases the correlation between images is small, even with images close together temporally, and there is the possibility that the advantage of motion-compensated prediction cannot be exploited.

One approach that solves this problem is multiple reference inter-frame prediction employed in H.264. With this prediction scheme, not only a temporally close image but also a temporally distant image is used in a prediction. If it is likely to improve encoding efficiency over that obtained with use of a nearby image, a distant image is utilized as the reference frame.

Thus, with H.264, motion-compensated prediction can be performed by selecting, from a plurality of images, an image for which the error between an input image and an image already encoded is smallest and utilizing the selected image as the reference frame. As a result, when a moving image is subjected to compression encoding, it is possible to achieve efficient encoding even if the motion of a camera shooting a moving picture image is fast or even in a case where a cut change has occurred.

However, if computations for selecting frames for which the error with respect to an input image is small are performed with regard to all images already encoded, the amount of computation increases in proportion to the number of frames referred to and the time required for encoding becomes enormous. Further, in the case of a mobile device such as a video camcorder, an increase in computation load leads to an increase in amount of battery consumption. Consequently, the effect upon available shooting time cannot be ignored.

SUMMARY OF THE INVENTION

Accordingly, the present invention makes it possible to execute motion compensation processing efficiently while reducing the amount of computation for motion compensation in multiple reference inter-frame prediction.

The present invention according to one aspect of preferable embodiments relates to a motion compensator for performing motion compensation using image information of an input frame and image information of any reference frame candidate among a plurality of reference frame candidates, comprising, a detection unit for detecting a first shift amount between temporally adjacent first and second frames, wherein the first shift amount is detected based upon a differential value between pixels constituting the first frame and pixels constituting the second frame, a storing unit for storing information of the first shift amount detected by the detection unit with regard to each of the plurality of reference frame candidates, a calculation unit for calculating a second shift amount between the input frame and each of the plurality of reference frame candidates based upon the first shift amount or a sum of the first shift amount from each of the plurality of reference frame candidates to the input frame, a selection unit for selecting a reference frame candidate for which the second shift amount is smallest as a reference frame, and a motion vector calculation unit for calculating a motion vector, with regard to each macro block that constitutes the input frame, based upon each macro block that constitutes the reference frame.

The present invention according to another aspect of preferable embodiments relates to a motion compensator for performing motion compensation using image information of an input frame and image information of any reference frame candidate among a plurality of reference frame candidates, comprising, a detection unit for detecting a first shift amount between temporally adjacent two frames, wherein the first shift amount is detected based upon a differential value of pixels between the two frames, a storing unit for storing information of the first shift amount detected by the detection unit with regard to each of the plurality of reference frame candidates, a calculation unit for calculating a second shift amount based upon a sum of the first shift amount from each of the plurality of reference frame candidates to the input frame, a selection unit for selecting a reference frame to be used in an inter-frame prediction of the input frame among the plurality of reference frame candidates based on a result of a calculation by the calculation unit and a motion vector calculation unit for calculating a motion vector between the input frame and the reference frame selected by the selection unit.

Further features of the present invention will become apparent from the following description of exemplary embodiments (with reference to the attached drawings).

BRIEF DESCRIPTION OF THE DRAWINGS

FIG. 6 is a diagram illustrating an example of the results of calculating a global vector between adjacent frames corresponding to the first embodiment of the present invention.

DESCRIPTION OF THE EMBODIMENTS

Preferred embodiments of the present invention will now be described with reference to FIGS. 1, 2 and 3.

First Embodiment

First the configuration and operation of a motion compensator corresponding to this embodiment of the present invention will be described with reference to FIGS. 1, 2 and 3.

Figure 1:
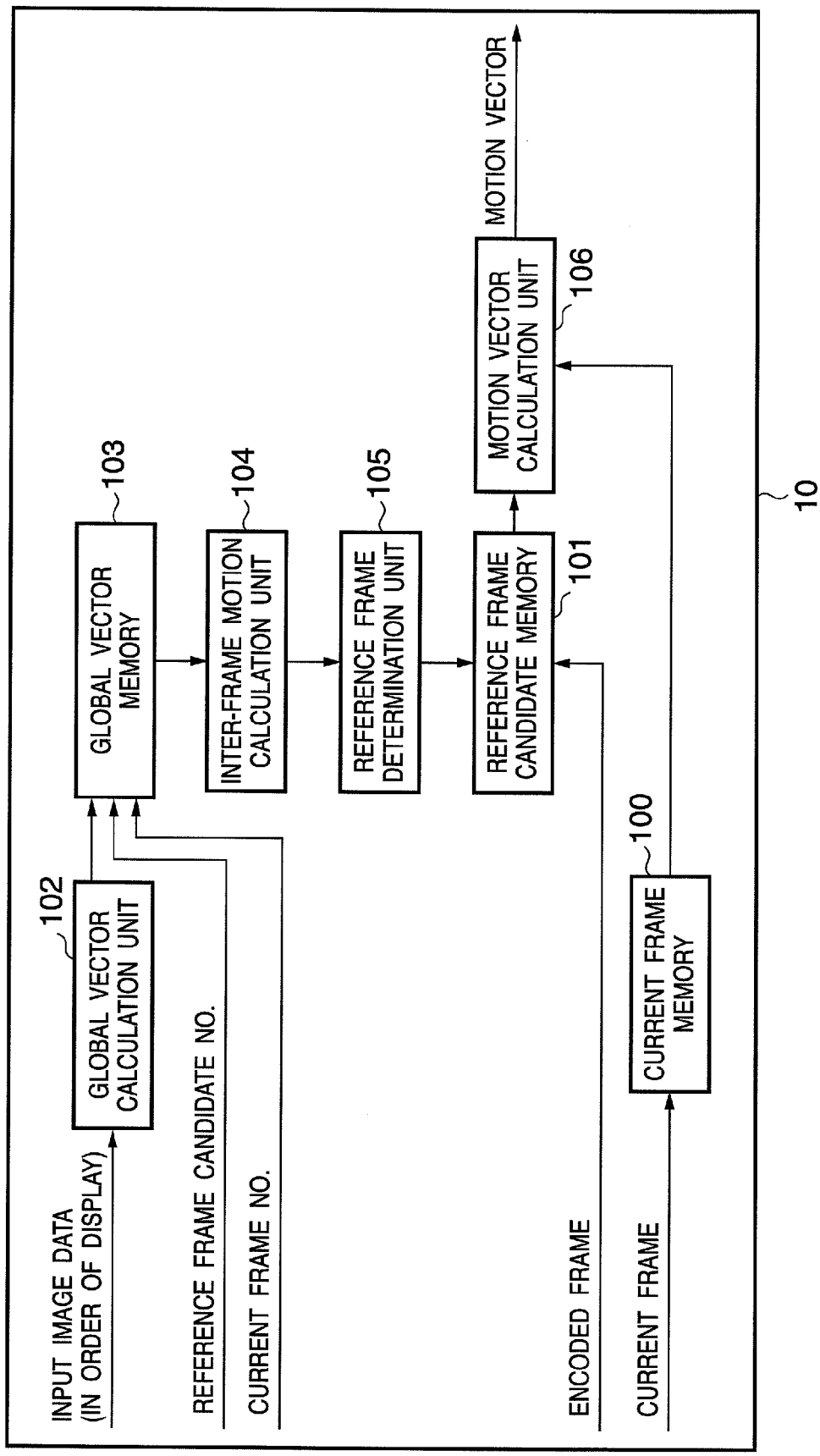
FIG. 1 is a diagram illustrating an example of the configuration of a motion compensator corresponding to a first embodiment of the present invention.

FIG. 1 is a diagram illustrating an example of the configuration of a motion compensator 10 corresponding to this embodiment of the present invention. The motion compensator 10 includes a current frame memory 100, a reference frame candidate memory 101, a global vector calculation unit 102, a global vector memory 103, an inter-frame motion calculation unit 104, a reference frame determination unit 105 and a motion vector calculation unit 106.

In the motion compensator 10 thus constructed, a current frame to be encoded and reference frame candidates, which are used in motion vector estimation, are stored in the current frame memory 100 and reference frame candidate memory 101, respectively. This embodiment will be described taking as an example a case where there are three reference frame candidates, which are denoted by Frame Nos. 0 to 2, selectable as reference frame candidates, and one current frame denoted by Frame No. 3, as illustrated in FIG. 2. In terms of the numerical order of these four frames, that with Frame No. 0 is situated as the leading frame in terms of time and that with Frame No. 3 is situated as the tail-end frame in terms of time. Further, the number of reference frame candidates cited here is merely by way of example and the number is not limited to that illustrated. In FIG. 2, "GV(i,j)" has been assigned to each frame. Here (i,j) indicate the values of the horizontal direction (i) and vertical direction (j) of a global vector corresponding to each frame number.

The global vector calculation unit 102 calculates a global vector that indicates a difference (i.e., an amount of shift between frames) in spatial position between frames that are input in the order of display at the time of movie playback. In order to estimate a global vector having the maximum degree of correlation, use is made of an evaluation function such as MSE (Mean Square Error) (Equation 1), MAE (Mean Absolute Error) (Equation 3) or MAD (Mean Absolute Difference), etc.

$$MSE(i,\,j) = \frac{1}{QR}\sum_{q=0}^{Q}\sum_{r=0}^{R}[S_{cur}(m+i,\,n+j) - S_{ref}(m,\,n)]^2 \quad \text{Equation 1}$$

$$GRV = \min MSE(i,\,j)\ (-M \le i \le M,\ -N \le j \le N) \quad \text{Equation 2}$$

$$MAE(i,\,j) = \frac{1}{QR}\sum_{q=0}^{Q}\sum_{r=0}^{R}|S_{cur}(m+i,\,n+j) - S_{ref}(m,\,n)| \quad \text{Equation 3}$$

$$GRV = \min MAE(i,\,j)\ (-M \le i \le M,\ -N \le j \le N) \quad \text{Equation 4}$$

Here $S_{cur}(m,n)$ indicates an (m,n)th pixel value of a currently input frame, and $S_{ref}(m,n)$ indicates an (m,n)th pixel value in a reference frame candidate.

Further, (i,j) represent spatial positions in the currently input frame with respect to the reference frame candidate.

Furthermore, if we let M, N represent the numbers of horizontal and vertical pixels in one frame and let k, l represent coefficients that indicate at what pixel intervals computation is performed in the horizontal and vertical directions, respectively, then m, n will be found from $m=k\times q$, $n=l\times r$, respectively. Further, k, l are natural numbers that satisfy the following: $0 \le m \le M$, $1 \le k \le M$, $0 \le n \le N$, $1 \le l \le N$. Further, Q, R can be found from $Q=(M-|i|)/k$, $R=(N-|j|)/l$.

This evaluation function is based upon a difference between pixels, and a case where the function has the smallest MAE value or MSE value is chosen as the global vector. That is, in Equation 1 or 2, the differential between each pixel value that prevails when the current frame has been moved in its entirety by (i,j) and each pixel value at the corresponding position in the reference frame is calculated, and the (i,j) for which the total of the differentials is smallest is decided upon as the global vector. Further, the smallest value of the total of the differentials is the GRV (Global vector Reliable Value) (Equations 2 and 4).

Figure 3:
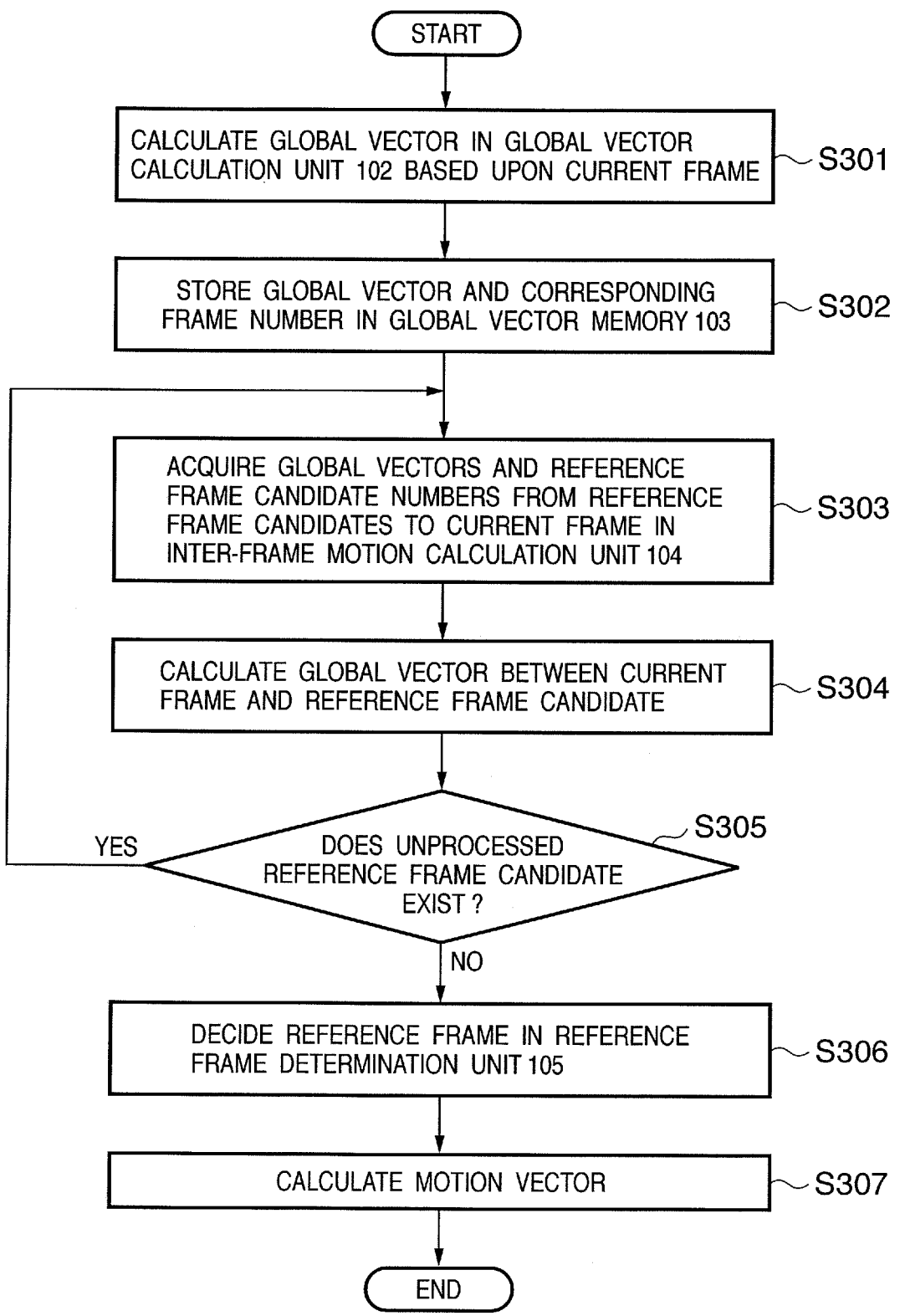
FIG. 3 is a flowchart illustrating an example of operation of the motion compensator corresponding to the first embodiment of the present invention.

In the flowchart of FIG. 3, the global vector is thus calculated at step S301. The global vector calculation unit 102 transmits the calculated global vector and the frame number of the frame correlated therewith to the global vector memory 103. The global vector memory 103 stores information of the global vector, which has been transmitted from the global vector calculation unit 102, in correspondence with the frame number at step S302.

Furthermore, at step S303, the inter-frame motion calculation unit 104 acquires the global vectors regarding frames (inclusive of the current frame) situated between the current frame number and the reference frame candidate numbers, as well as the reference frame candidate number.

For example, consider a case where the current frame number is No. 3 and the reference frame candidate number is No. 0. In this case the frames situated between the current frame number and the reference frame candidate number are the frames of Frame Nos. 1, 2 and 3 in FIG. 2. The inter-frame motion calculation unit 104 acquires the global vector regarding each of these three frames, and acquires No. 0 as the reference frame candidate number.

Next, at step S304, a value $GV_{cur,ref}$ corresponding to the global vector between the current frame and the reference frame candidate is calculated from Equation 5 (described later) utilizing the acquired global vector and the reference frame candidate number. As a result, the amount of shift between the current frame and the reference frame can be calculated. The calculated global vector is correlated with the reference frame candidate and transmitted to the reference frame determination unit 105.

Next, at step S305, it is determined whether a reference frame candidate that has not yet been processed exists. If an unprocessed reference frame candidate exists ("YES" at step S305), then control returns to step S303 and processing is continued.

That is, with the reference frame candidate number being No. 1, global vectors correlated with Frame Nos. 2 to 3 and the reference frame candidate No. 1 are acquired by the inter-frame motion calculation unit 104. Furthermore, with the reference frame candidate number being No. 2, a global vector correlated with Frame No. 3 and the reference frame candidate No. 2 are acquired by the inter-frame motion calculation unit 104.

The acquired global vectors are utilized in order to calculate the global vectors between the reference frame candidate and the current frame at step S304.

A detailed example of the processing executed at step S304 will now be described. First, Equation 5 is as follows:

$$GVcur, ref = \left( \sum_{n=refno+1}^{curno-refno} x_n, \sum_{n=refno+1}^{curno-refno} y_n \right) \ldots curno \geq refno$$

$$GVcur, ref = \left( \sum_{n=refno+1}^{refno-curno} x_n, \sum_{n=refno+1}^{refno-curno} y_n \right) \ldots curno < refno$$

Equation 5

Here "curno" represents the current frame number, "refno" represents the reference frame candidate number, $x_n$ represents the horizontal value of the global vector corresponding to the reference frame candidate of No. n, and $y_n$ represents the vertical value of the global vector corresponding to the reference frame candidate of No. n.

A specific example of calculation of a global vector will be described taking FIG. 2 as an example. If the reference frame number is No. 0, the sum of global vectors correlated with Frame Nos. 1 to 3 is calculated and obtained as $GV_{cur,ref}$. That is, we have (7,6)+(−5,−5)+(5,5)=(7,6). This is adopted as the global vector between the current frame (No. 3) and a reference frame candidate (No. 0).

Next, if the reference frame candidate is No. 1, the sum of global vectors correlated with Frame Nos. 2 and 3 is calculated and obtained as $GV_{cur,ref}$. That is, we have (−5,−5)+(5,5)=(0,0). This is adopted as the global vector between the current frame (No. 3) and a reference frame candidate (No. 1).

Furthermore, if the reference frame candidate is No. 2, the sum of global vectors correlated with Frame No. 3 is calculated and obtained as $GV_{cur,ref}$. That is, we have (5,5). This is adopted as the global vector between the current frame (No. 3) and a reference frame candidate (No. 2).

When the global vector $GV_{cur,ref}$ is calculated with regard to all of the reference frame candidates by the foregoing operation ("NO" at step S305), control proceeds to step S306. Here the reference frame is decided by the reference frame determination unit 105 in accordance with the global vector for every reference frame candidate, the global vectors having been received from the inter-frame motion calculation unit 104. The frame number of the decided reference frame is transmitted to the reference frame candidate memory 101.

More specifically, using Equation 6 below, the reference frame determination unit 105 obtains a value $GVlen^2_{cur,ref}$ corresponding to the square of the length of the global vector between the current frame and reference frame candidate for each reference frame candidate transmitted from the inter-frame motion calculation unit 104.

$$GVlen^2_{cur,ref} = x_{cur,ref}^2 + y_{cur,ref}^2$$

Equation 6

Here $x_{cur,ref}$ is the value of $GV_{cur,ref}$ in the horizontal direction, and $y_{cur,ref}$ is the value of $GV_{cur,ref}$ in the vertical direction.

Figure 2:
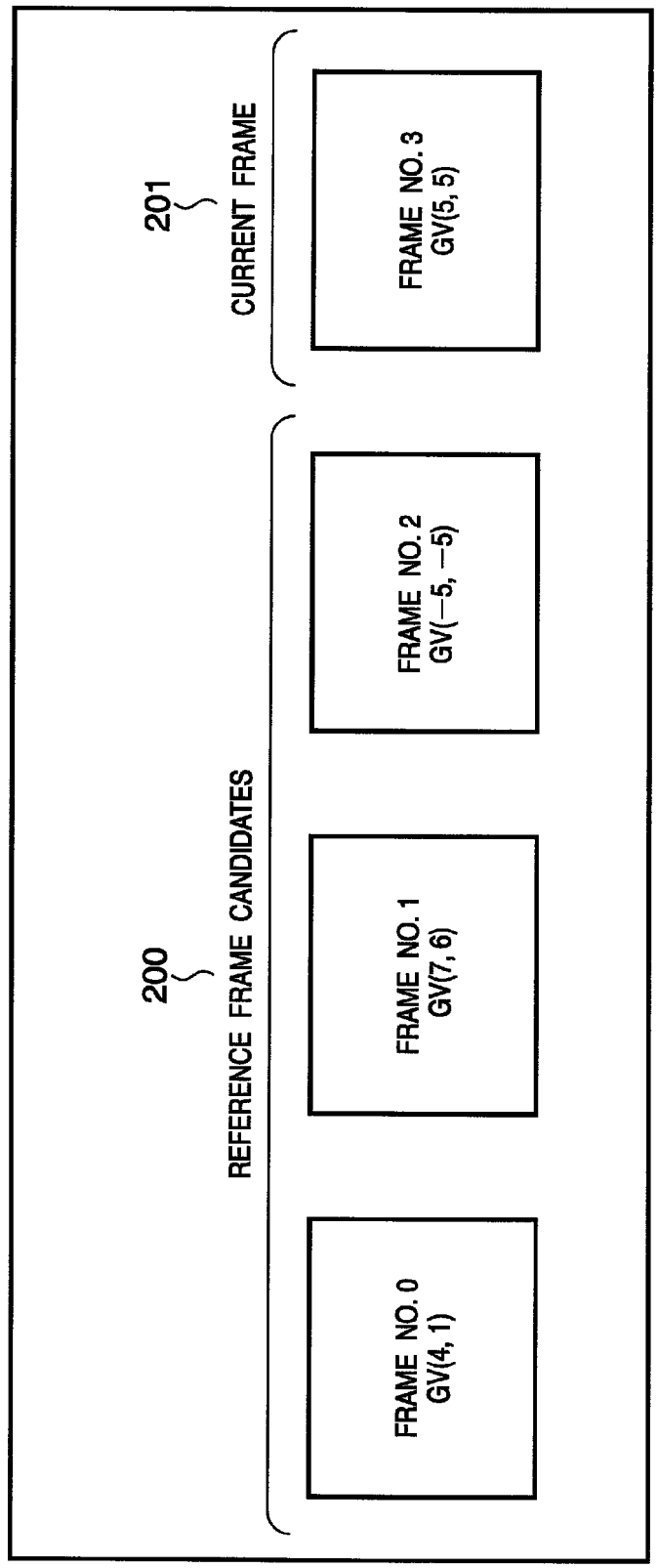
FIG. 2 is a diagram illustrating an example of the states of reference frame candidates and a current frame corresponding to the first embodiment of the present invention.

With regard to a more detailed description of Equation 6 taking FIG. 2 as an example, $GVlen^2_{cur,ref}$ corresponding to Frame No. 0 among the reference frame candidates is $7^2+6^2=85$. Further, the value corresponding to Frame No. 1 is 0, and the value corresponding to Frame No. 2 is found to be $5^2+5^2=50$.

The $GVlen^2_{cur,ref}$ thus calculated with regard to each of the reference frame candidates is compared between reference frame candidates, and the frame for which this value is smallest is decided upon as the reference frame. If stated in terms of the example depicted in FIG. 2, the value corresponding to Frame No. 1 is 0, which is the smallest value, and therefore the reference frame is the frame of Frame No. 1.

The frame number of the reference frame thus decided is transmitted to the reference frame candidate memory 101. It should be noted that a case where there are a plurality of reference frame candidates for which $GVlen^2_{cur,ref}$ is smallest is also conceivable. In such case the reference frame candidate among the reference frame candidates that is closest to the current frame in terms of time can be decided upon as the reference frame.

Next, at step S307, the motion vector calculation unit 106 executes processing for calculating a motion vector.

First, the motion vector calculation unit 106 extracts one of a plurality of macro blocks, which construct the current frame, from the current frame memory 100. At the same time, an image necessary for prediction is transmitted to the motion vector calculation unit 106 from the reference frame candidate of Frame No. 1 that has been stored in the reference frame candidate memory 101.

The motion vector calculation unit 106 conducts a search in the image data transmitted from the reference frame candidate memory 101 and estimates a motion vector in the current macro block. If we assume that the motion vector of a macro block of size N×N is searched over a range of ±p pixels in the reference frame, the search zone will be (N+2p)×(N+2p). After calculating correlation coefficients at a total of $(2p+1)^2$ positions that can be motion vector candidates, the motion vector calculation unit 106 decides that the position indicating the maximum degree of correlation is the motion vector.

In order to estimate the motion vector having the maximum correlation, use is made of an evaluation function such as the above-mentioned MSE (Mean Square Error) (Equation 7), MAE (Mean Absolute Error) (Equation 9) or MAD (Mean Absolute Difference), etc.

$$MSE(i, j, k) = \frac{1}{UV} \sum_{u=0}^{U} \sum_{v=0}^{V} [S_{cur,k}(x, y) - S_{ref}(x+i, y+j)]^2$$

Equation 7

$$LRV(k) = \min MSE(i, j, k) \ (-X \leq i \leq X, -Y \leq j \leq Y) \quad \text{Equation 8}$$

$$MAE(i, j, k) = \frac{1}{UV} \sum_{u=0}^{U} \sum_{v=0}^{V} |S_{cur,k}(x, y) - S_{ref}(x+i, y+j)| \quad \text{Equation 9}$$

$$LRV(k) = \min MSE(i, j, k) \ (-X \leq i \leq X, -Y \leq j \leq Y) \quad \text{Equation 10}$$

Here $S_{ref}$ indicates the reference frame, and $S_{cur,k}$ indicates a kth macro block in the current frame. Further, (i,j) represent spatial positions in the reference frame with respect to the kth macro block of the current frame.

If we let X, Y represent the numbers of horizontal and vertical pixels in the vector search zone and let g, h represent coefficients that indicate at what pixel intervals computation is performed in the horizontal and vertical directions, respectively, then x, y will be found from x=g×u, y=h×v, respectively. Further, g, h are natural numbers that satisfy the following: 0≤x≤X, 1≤g≤X, 0≤y≤Y, 1≤h≤Y. Further, U, V can be found from U=X−|i|, V=Y−|j|.

This evaluation function is based upon a difference between pixels, and a case where the function has the smallest MAE value or MSE value is chosen as the final motion vector in the current macro block.

In this embodiment, the reference frame candidate for which the global vector between the current frame and reference frame candidate is the shortest is adopted as the reference frame. The method of deciding the reference frame is not limited to this method. For example, the reference frame may be decided based upon this embodiment only in a case where the reference frame candidate that is closest in terms of time is basically used as the reference frame and the length of the global vector between the current frame and the reference frame has exceeded a predetermined length (a predetermined threshold value). In this case, the motion vector search zone, etc., is conceivable as the predetermined length.

Further, in this embodiment, one global vector is calculated with respect to one current frame and reference frame candidates. However, the current frame and reference frame candidates may be divided into a plurality of areas, the global vector and GRV calculated with regard to each area and the reference frame of each area decided using these global vectors.

Figure 5:
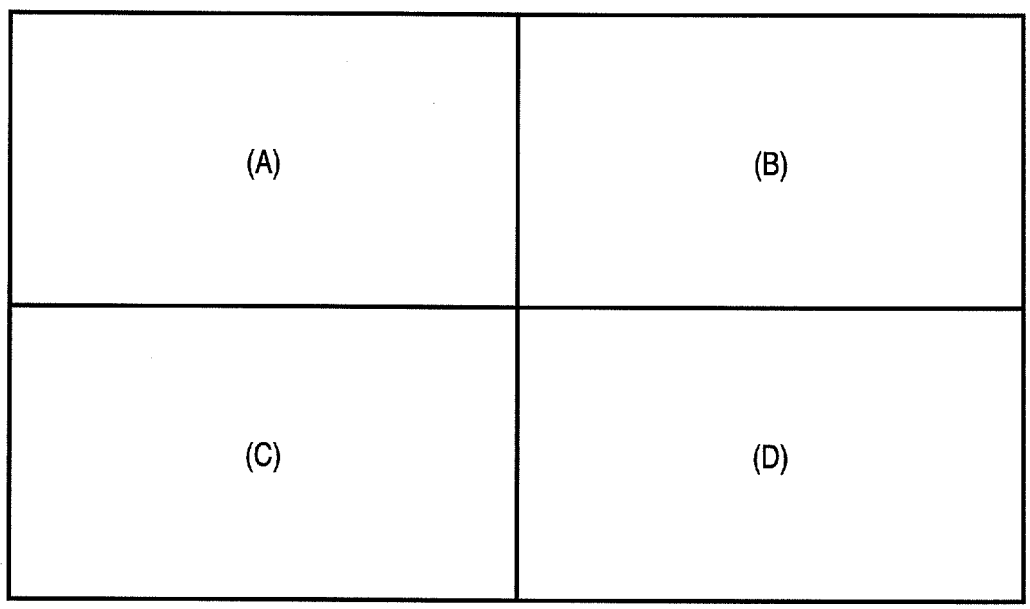
FIG. 5 is a diagram illustrating an example of division of an image into blocks corresponding to the first embodiment of the present invention.

Processing for deciding a reference frame in a case where an image has been divided into a plurality of areas will be described with reference to FIGS. 5 and 6. FIG. 5 is a diagram illustrating an example in which an image frame has been divided into four areas. As shown in FIG. 5, the image frame is divided into four areas (A) to (D). Global vectors between adjacent frames are calculated for every area obtained by such division.

The result of calculating global vectors between adjacent frames is as shown in FIG. 6. In FIG. 6, global vectors are indicated block by block with regard to each frame of Frame Nos. 0 to 3. The frames of Frame Nos. 0 to 2 are reference frame candidates 600, and the frame of Frame No. 3 is a current frame 601.

First, if a global vector is found in the area (A) of FIG. 5 using the values of FIG. 6, the global vector between the current frame (No. 3) and a reference frame candidate (No. 0) is (7,6)+(−5,−5)+(5,5)=(7,6). Further, the global vector between the current frame (No. 3) and a reference frame candidate (No. 1) is (−5,−5)+(5,5)=(0,0). Further, the global vector between the current frame (No. 3) and a reference frame candidate (No. 2) is (5,5). Accordingly, the reference frame in area (A) of FIG. 5 is the frame of Frame No. 1.

Similarly, if the reference frame in the area (B) of FIG. 5 is found, the global vector between the current frame (No. 3) and a reference frame candidate (No. 0) is (−5,−5)+(7,6)+(7,6)=(9,7). The global vector between the current frame (No. 3) and a reference frame candidate (No. 1) is (7,6)+(7,6)=(14,12). Further, the global vector between the current frame (No. 3) and a reference frame candidate (No. 2) is (7,6). The reference frame, therefore, is the frame of Frame No. 2.

Similarly, the reference frames in areas (C) and (D) of FIG. 5 are the frames of Frame Nos. 1 and 0.

Thus, in accordance with this embodiment, from among a plurality of reference frame candidates, a frame having the strongest correlation overall with the current frame is selected and the motion vector can be calculated. As a result, it is no longer necessary to conduct a motion vector search with regard to all reference frame candidates. This makes it possible to suppress the amount of computation and to execute efficiently the processing for compression encoding of moving images.

Further, by dividing a current frame and reference frame candidates into a plurality of areas and calculating the global vector and GRV in each area, an appropriate reference frame can be selected for every finely divided area without greatly increasing the amount of computation.

Second Embodiment

Figure 4:
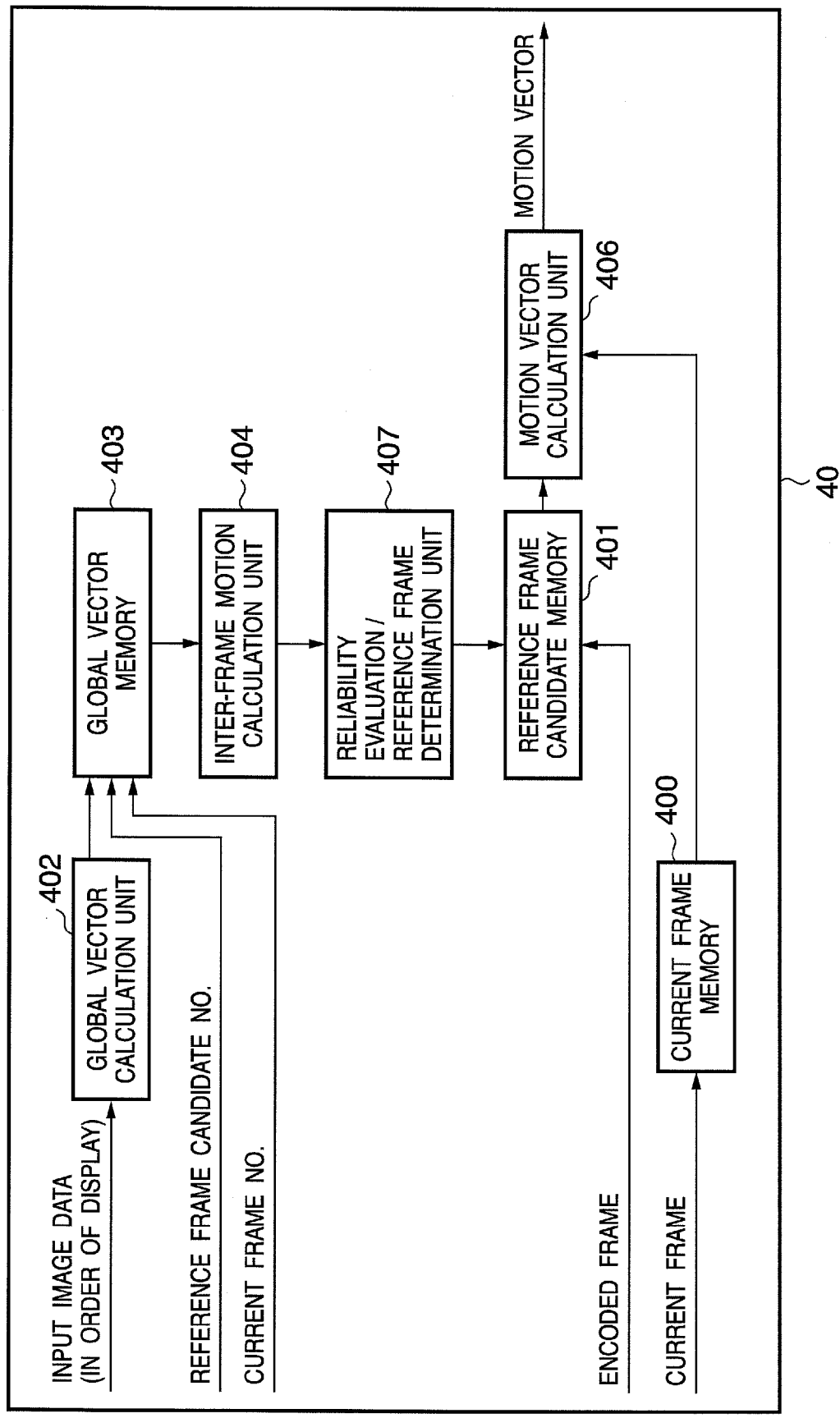
FIG. 4 is a diagram illustrating an example of the configuration of a motion compensator corresponding to a second embodiment of the present invention.

A second embodiment of the present invention will now be described with reference to FIGS. 3 and 4. FIG. 4 is a diagram illustrating an example of the configuration of a motion compensator 40 corresponding to this embodiment. The motion compensator 40 has a configuration substantially the same as that of the motion compensator 10 of the first embodiment. The only difference is that the reference frame determination unit 105 is replaced by a reliability evaluation/reference frame determination unit 407.

First, operation up to a current frame memory 400 and reference frame candidate memory 401 is similar to that of current frame memory 100 and reference frame candidate memory 101 of the first embodiment and need not be described again. Operation from the global vector calculation unit 402 onward will now be described.

The global vector calculation unit 402 decides a global vector at step S301 in a manner similar to that of global vector calculation unit 102 in FIG. 1. However, in order to use the GRV of Equations 2 and 4 as a global vector reliability value in a latter stage, the global vector calculation unit 402 sends the global vector memory 403 the GRV in addition to the global vector and the frame number corresponding thereto.

At step S302, the global vector memory 403 stores the global vector and GRV, which have been transmitted from the global vector calculation unit 402, in correspondence with the frame number transmitted thereto simultaneously. Further, the inter-frame motion calculation unit 404 acquires the global vectors between the current frame number and reference frame candidate numbers, the GRV and the reference frame candidate number.

At step S304, the inter-frame motion calculation unit 404 uses Equation 5 to calculate the value $GV_{cur,ref}$ corresponding to the global vector between the current frame and the reference frame candidate. Further, using Equation (11) below, the inter-frame motion calculation unit 404 obtains $GRV_{cur,ref}$, which corresponds to the reliability value of the global vector between the reference frame and the reference frame candidate.

$$GRV_{cur,ref} = \frac{\sum_{n=refno+1}^{curno-refno} GRV_n}{curno - refno}$$

Equation 11

Here "curno" represents the current frame number, "refno" represents the reference frame candidate number, and GRVn represents the global vector reliability value corresponding to the reference frame candidate of No. n. Further, the inter-frame motion calculation unit 404 transmits $GV_{cur,ref}$ and $GRV_{cur,ref}$ to the reliability evaluation/reference frame determination unit 407 along with the reference frame candidate number.

At step S306, the reliability evaluation/reference frame determination unit 407 performs an operation for obtaining $GVlen^2_{cur,ref}$, which was executed by the reference frame determination unit 105 in the first embodiment, through a similar method.

The reliability evaluation/reference frame determination unit 407 compares $GVlen^2_{cur,ref}$, which has been found for each reference frame candidate, between reference frame candidates, and compares $GRV_{cur,ref}$ of the reference frame candidate for which the value of $GVlen^2_{cur,ref}$ is smallest with a preset threshold value Th. The threshold value Th can be set to satisfy Th=M×N using the numbers M and N of pixels horizontally and vertically, respectively, in one frame in Equation 1.

If $GRV_{cur,ref}$ is smaller than Th, then it is judged that the reliability of the global vector is high and the reliability evaluation/reference frame determination unit 407 selects the reference frame candidate prevailing at this time as the reference frame. If $GRV_{cur,ref}$ is larger than Th, on the other hand, then it is judged that the reliability of the global vector is low and therefore the reliability evaluation/reference frame determination unit 407 selects the reference frame candidate closest to the current frame in terms of time as the reference frame.

At step S307 in a manner similar to that of the motion vector calculation unit 106 the first embodiment, a motion vector calculation unit 406 uses Equations 7 to 10 to conduct a search in the image data that is sent from the reference frame candidate memory 401 and estimates the final motion vector in the current macro block.

Thus, in accordance with this embodiment, a differential value (GRV) in pixel values between two frames based upon a global vector is utilized as a reliability value, and a reference frame can be selected from among reference frame candidates. As a result, it is no longer necessary to conduct a motion vector search with regard to all reference frame candidates. This makes it possible to suppress the amount of computation and to execute efficiently the processing for compression encoding of moving images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-041655, filed Feb. 17, 2006 which is hereby incorporated by reference herein in its entirety.

What is claimed is:

1. A motion compensator for performing motion compensation using image information of an input frame currently inputted and image information of any reference frame candidate among a plurality of reference frame candidates of input frames previously inputted, said motion compensator comprising:
   a global vector calculation unit configured to calculate a global vector indicating a first shift amount between temporally adjacent first and second frames of a plurality of input frames;
   a global vector storing unit configured to store, with regard to the plurality of input frames, information of a respectively corresponding plurality of global vectors calculated by said global vector calculation unit;
   an inter-frame motion calculation unit configured to calculate, for a desired reference frame candidate, a second shift amount between the input frame and the desired reference frame candidate, in accordance with a sum of global vectors;
   a reference frame determination unit configured to select, as a reference frame, the reference frame candidate for which the second shift amount is the smallest among the second shift amounts of the plurality of reference frame candidates; and
   a motion vector calculation unit configured to calculate a motion vector to perform the motion compensation, with regard to each image block that constitutes the input frame, based upon each image block that constitutes the reference frame.

2. The motion compensator according to claim 1, wherein said reference frame determination unit selects, as the reference frame, the reference frame candidate for which a shift amount is the smallest among the first shift amount detected between the input frame and a reference frame candidate that is temporally adjacent to the input frame, and the second shift amounts found between the input frame and other reference frame candidates that are not temporally adjacent to the input frame.

3. The motion compensator according to claim 1, wherein in a case where the first shift amount that has been detected with regard to the input frame between the input frame and a reference frame candidate that is temporally adjacent to the input frame exceeds a predetermined threshold value, said reference frame determination unit selects, as the reference frame, a reference frame candidate for which the second shift amount is the smallest.

4. The motion compensator according to claim 1, wherein in a case where an evaluation value of the second shift amount of the reference frame candidate for which the second shift amount is the smallest exceeds a predetermined threshold value, said reference frame determination unit selects, as the reference frame, a reference frame candidate that is temporally adjacent to the input frame; and
   wherein the evaluation value is calculated using a minimum differential value for detecting each of the first shift amounts of the input frame and the reference frame candidate situated between the reference frame candidate for which the second shift amount is smallest and the input frame.

5. The motion compensator according to claim 1, wherein said inter-frame motion calculation unit calculates the second shift amount by the sum of the first shift amounts of frames included between the input frame and any of the plurality of reference frame candidates.

6. The motion compensator according to claim 1, wherein the input frame and reference frame candidates are each divided into a plurality of areas, and
   wherein the first and second shift amounts are found with regard to each of the areas.

7. A motion compensator for performing motion compensation using image information of an input frame currently inputted and image information of any reference frame candidate among a plurality of reference frame candidates of input frames previously inputted, said motion compensator comprising:
- a global vector calculation unit configured to calculate a global vector indicating a first shift amount between two temporally adjacent frames of a plurality of input frames;
- a global vector storing unit configured to store, with respect to the plurality of input frames, information of a respectively corresponding plurality of global vectors calculated by said global vector calculation unit;
- an inter-frame motion calculation unit configured to calculate, for a desired reference frame candidate, a second shift amount in accordance with a sum of global vectors;
- a reference frame determination unit configured to select a reference frame, to be used in an inter-frame forward prediction or an inter-frame backward prediction of the input frame, among the plurality of reference frame candidates based on a result of a calculation by said inter-frame motion calculation unit; and
- a motion vector calculation unit configured to calculate a motion vector between the input frame and the reference frame selected by said reference frame determination unit to perform the motion compensation.

8. A motion compensation processing method of performing motion compensation using image information of an input frame currently inputted and image information of any reference frame candidate among a plurality of reference frame candidates of input frames previously inputted, said method comprising:
- a global vector calculation step of calculating a global vector indicating a first shift amount between temporally adjacent first and second frames of a plurality of input frames;
- a global vector storing step of storing information, with regard to the plurality of input frames, of a respectively corresponding plurality of global vectors calculated in said global vector calculation step;
- an inter-frame motion calculation step of calculating, for a desired reference frame candidate, a second shift amount between the input frame and the desired reference frame candidate, in accordance with a sum of global vectors;
- a reference frame determination step of selecting, as a reference frame, the reference frame candidate for which the second shift amount is the smallest among the second shift amounts of the plurality of reference frame candidates; and
- a motion vector calculation step of calculating a motion vector to perform the motion compensation, with regard to each image block that constitutes the input frame, based upon each image block that constitutes the reference frame.

9. The method according to claim 8, wherein in said reference frame determination step, the reference frame candidate is selected, as the reference frame, for which a shift amount is smallest among the first shift amount detected between the input frame and a reference frame candidate that is temporally adjacent to the input frame, and the second shift amounts found between the input frame and other reference frame candidates that are not temporally adjacent to the input frame.

10. The method according to claim 8, wherein in a case where the first shift amount that has been detected with regard to the input frame between the input frame and a reference frame candidate that is temporally adjacent to the input frame exceeds a predetermined threshold value, a reference frame candidate for which the second shift amount is smallest is selected as the reference frame in said reference frame determination step.

11. The method according to claim 8, wherein in a case where an evaluation value of the shift amount of the second reference frame candidate for which the second shift amount is smallest exceeds a predetermined threshold value, a reference frame candidate that is temporally adjacent to the input frame is selected as the reference frame in said reference frame determination step, and
- wherein the evaluation value is calculated using a minimum differential value for detecting each of the first shift amounts of the input frame and the reference frame candidate situated between the reference frame candidate for which the second shift amount is the smallest and the input frame.

12. The method according to claim 8, wherein the second shift amount is calculated in said inter-frame motion calculation step by the sum of the first shift amounts of frames included between the input frame and any of the plurality of reference frame candidates.

13. The method according to claim 8, wherein the input frame and reference frame candidates are each divided into a plurality of areas, and the first and second shift amounts are found with regard to each of the areas.

14. A motion compensation processing method of performing motion compensation using image information of an input frame currently inputted and image information of any reference frame candidate among a plurality of reference frame candidates of input frames previously inputted, said method comprising:
- a global vector calculation step for calculating a global vector indicating a first shift amount between two temporally adjacent frames of a plurality of input frames;
- a global vector storing step for storing, with regard to the plurality of input frames, information of a respectively corresponding plurality of global vectors calculated in said global vector calculation step;
- an inter-frame motion calculation step for calculating, for a desired reference frame candidate, a second shift amount in accordance with a sum of global vectors;
- a reference frame determination step for selecting a reference frame, to be used in an inter-frame forward prediction or an inter-frame backward prediction of the input frame, among the plurality of reference frame candidates based on a result of a calculation in said inter-frame motion calculation step; and
- a motion vector calculation step for calculating a motion vector between the input frame and the reference frame selected in said reference frame determination step to perform the motion compensation.

15. A computer program stored in a non-transitory computer-readable storage medium, wherein said computer program causes a computer to function as a motion compensator for performing motion compensation using image information of an input frame currently inputted and image information of any reference frame candidate among a plurality of reference frame candidates of input frames previously inputted, said motion compensator comprising:
- a global vector calculation unit configured to calculate a global vector indicating a first shift amount between temporally adjacent first and second frames of a plurality of input frames;
- a global vector storing unit configured to store, with regard to the plurality of input frames, information of a respectively corresponding plurality of global vectors calculated by said global vector detection unit;

an inter-frame motion calculation unit configured to calculate, for a desired reference frame candidate, a second shift amount between the input frame and the desired reference frame candidate, in accordance with a sum of global vectors;

a reference frame determination unit configured to select, as a reference frame, the reference frame candidate for which the second shift amount is the smallest among the second shift amounts of the plurality of reference frame candidates; and a motion vector calculation unit configured to calculate a motion vector to perform the motion compensation, with regard to each image block that constitutes the input frame, based upon each image block that constitutes the reference frame.

16. A computer program stored in a non-transitory computer-readable storage medium, wherein said computer program causes a computer to function as a motion compensator for performing motion compensation using image information of an input frame currently inputted and image information of any reference frame candidate among a plurality of reference frame candidates of input frames previously inputted, said motion compensator comprising:

a global vector calculation unit configured to calculate a global vector indicating a first shift amount between two temporally adjacent frames of a plurality of input frames;

a global vector storing unit configured to store, with respect to the plurality of input frames, information of a respectively corresponding plurality of global vectors calculated by said global vector calculation unit;

an inter-frame motion calculation unit configured to calculate, for a desired reference candidate, a second shift amount in accordance with a sum of global vectors;

a reference frame determination unit configured to select a reference frame, to be used in an inter-frame forward prediction or an inter-frame backward prediction of the input frame, among the plurality of reference frame candidates based on a result of a calculation by said inter-frame motion calculation unit; and a motion vector calculation unit configured to calculate a motion vector between the input frame and the reference frame selected by said reference frame determination unit to perform the motion compensation.

17. The motion compensator according to claim 1, wherein the frames existing between the input frame currently inputted and the desired reference frame include the input frame currently inputted.

18. The motion compensator according to claim 17, wherein the frames existing between the input frame currently inputted and the desired reference frame exclude the desired reference frame.

19. The motion compensator according to claim 1, wherein the sum of global vectors is a vector comprising (a) a horizontal value that is a sum of horizontal values of the global vectors being summed and (b) a vertical value that is a sum of vertical values of the global vectors being summed, and wherein the second shift amount is calculated in accordance with a magnitude of that the sum of global vectors.

20. The motion compensator according to claim 1, wherein in a case where the desired reference candidate is two frames prior to the input frame currently inputted, then the global vectors of frames existing between the input frame currently inputted and the desired reference frame are the following two frames: (a) the frame immediately prior to the input frame currently inputted and (b) the input frame currently inputted, and wherein the sum of global vectors is a sum of global vectors of frames (a) and (b).

21. The motion compensator according to claim 7, wherein the sum of global vectors is a vector comprising (a) a horizontal value that is a sum of horizontal values of the global vectors being summed and (b) a vertical value that is a sum of vertical values of the global vectors being summed, and wherein the second shift amount is calculated in accordance with a magnitude of the sum of global vectors.

22. A motion compensator for performing motion compensation using image information of an input frame currently inputted and image information of any reference frame candidate among a plurality of reference frame candidates of input frames previously inputted, said motion compensator comprising:

a reference frame determination unit that selects a reference frame from among the plurality of reference frame candidates; and a motion vector calculation unit that calculates a motion vector to perform the motion compensation, with regard to each image block that constitutes the input frame, wherein the reference frame determination unit selects reference frame based on shift amounts between the input frame and the plurality of reference frame candidates, and wherein the reference frame determination unit selects, as the reference frame, the reference frame candidate for which the shift amount is the smallest among the shift amounts between the input frame and the plurality of reference frame candidates.

23. A motion compensator for performing motion compensation using image information of an input frame currently inputted and image information of any reference frame candidate among a plurality of reference frame candidates of input frames previously inputted, said motion compensator comprising:

a reference frame determination unit that selects a reference frame from among the plurality of reference frame candidates; and a motion vector calculation unit that calculates a motion vector to perform the motion compensation, with regard to each image block that constitutes the input frame, wherein the reference frame determination unit selects reference frame based on shift amounts between the input frame and the plurality of reference frame candidates, wherein the input frame and reference frame candidates are each divided into a plurality of areas, and wherein the shift amounts are found with regard to each of the areas.

24. A motion compensator for performing motion compensation using image information of an input frame currently inputted and image information of any reference frame candidate among a plurality of reference frame candidates of input frames previously inputted, said motion compensator comprising:

a reference frame determination unit that selects a reference frame, to be used in an inter-frame forward prediction or an inter-frame backward prediction of the input frame, from among the plurality of reference frame candidates; and a motion vector calculation unit that calculates a motion vector to perform the motion compensation, with regard to each image block that constitutes the input frame, wherein the reference frame determination unit selects the reference frame based on shift amounts between the input frame and the plurality of reference frame candidates, and wherein the reference frame determination unit selects, as the reference frame, the reference frame candidate for which the shift amount is the smallest among the shift amounts between the input frame and the plurality of reference frame candidates.

25. A motion compensator for performing motion compensation using image information of an input frame currently inputted and image information of any reference frame candidate among a plurality of reference frame candidates of input frames previously inputted, said motion compensator comprising:

a reference frame determination unit that selects a reference frame, to be used in an inter-frame forward prediction or an inter-frame backward prediction of the input frame, from among the plurality of reference frame candidates; and a motion vector calculation unit that calculates a motion vector to perform the motion compensation, with regard to each image block that constitutes the input frame, wherein the reference frame determination unit selects the reference frame based on shift amounts between the input frame and the plurality of reference frame candidates, wherein the input frame and reference frame candidates are each divided into a plurality of areas, and wherein the shift amounts are found with regard to each of the areas.

26. A motion compensation processing method of performing motion compensation using image information of an input frame currently inputted and image information of any reference frame candidate among a plurality of reference frame candidates of input frames previously inputted, said method comprising:

selecting a reference frame, to be used in an inter-frame forward prediction or an inter-frame backward prediction of the input frame, based on shift amounts between the input frame and the plurality of reference frame candidates from among the plurality of reference frame candidates; and calculating a motion vector to perform the motion compensation, with regard to each image block that constitutes the input frame, wherein in said selecting a reference frame, there is selected as the reference frame the reference frame candidate for which the shift amount is the smallest among the shift amounts between the input frame and the plurality of reference frame candidates.

27. A motion compensation processing method of performing motion compensation using image information of an input frame currently inputted and image information of any reference frame candidate among a plurality of reference frame candidates of input frames previously inputted, said method comprising:

selecting a reference frame, to be used in an inter-frame forward prediction or an inter-frame backward prediction of the input frame, based on shift amounts between the input frame and the plurality of reference frame candidates from among the plurality of reference frame candidates; and calculating a motion vector to perform the motion compensation, with regard to each image block that constitutes the input frame, wherein the input frame and reference frame candidates are each divided into a plurality of areas, and wherein the shift amounts are found with regard to each of the areas.

* * * * *